United States Patent [19]

Murata et al.

[11] Patent Number: 4,802,200

[45] Date of Patent: Jan. 31, 1989

[54] RADIO TELEPHONE SYSTEM CONTROL APPARATUS AND METHOD

[75] Inventors: Yoshitoshi Murata, Yokosuka; Kazuhiro Yoshizawa, Kashiwa; Akio Yotsutani, Tokyo; Koichi Ito, Hino, all of Japan

[73] Assignees: Nippon Telegraph and Telephone Corporation; NEC Corporation, both of Tokyo, Japan

[21] Appl. No.: 900,590

[22] Filed: Aug. 26, 1986

[30] Foreign Application Priority Data

Aug. 27, 1985 [JP] Japan .................................. 60-187760
Aug. 27, 1985 [JP] Japan .................................. 60-187765

[51] Int. Cl.⁴ .......................................... H04M 11/00
[52] U.S. Cl. ........................................ 379/61; 379/57
[58] Field of Search .......................... 379/57, 61, 62; 340/825.44

[56] References Cited

U.S. PATENT DOCUMENTS

| | | | |
|---|---|---|---|
| 3,586,978 | 6/1971 | Gorder | 379/61 |
| 4,628,152 | 12/1986 | Åkerberg | 379/61 |
| 4,672,658 | 6/1987 | Kavehrad et al. | 379/61 |
| 4,679,225 | 7/1987 | Higashiyama | 379/62 |

FOREIGN PATENT DOCUMENTS 0011606 1/1979 Japan ............................... 379/61
0011605 1/1979 Japan ............................... 379/61

Primary Examiner—Robert Lev
Attorney, Agent, or Firm—Finnegan, Henderson, Farabow, Garrett, & Dunner

[57] ABSTRACT

A method and apparatus for controlling a radio telephone system of the type wherein a connection between a wired telephone channel and a plurality of radio telephone handsets is controlled by a single base station connected to the wired telephone channel, a ring signal through the wired telephone channel is detected, a paging signal is sent to the radio telephone handsets from the base station when the ring signal is detected and a paging response signal is sent to the base station from the radio telephone handset in response to the paging signal. Further a channel designating signal is sent to the radio telephone handset in accordance with the paging response signal, a radio channel of the base station is switched to a radio channel corresponding to the channel designating signal, the radio channel of the radio telephone handset is switched to a radio channel corresponding to the channel designating signal, and a speech channel is established between a radio telephone handset responding to the paging signal and the wired telephone channel.

34 Claims, 6 Drawing Sheets

RADIO TELEPHONE SYSTEM CONTROL APPARATUS AND METHOD

BACKGROUND OF THE INVENTION

1. Field of the Invention

This invention relates to a radio telephone system control apparatus and a method for controlling the connection of a base station connected to wired telephone channel and a plurality of radio telephone handsets connected to the base station through radio channels with the base station, and more particularly an apparatus for controlling the connection in response to a ring signal made through lines for wired telephone sets.

2. Description of the Related Arts

Radio-telephone systems comprise a base station connected to wired telephone channels and one or more radio telephone handsets connected to the base station through radio channels, such as a cordless telephone. The cordless telephone apparatus consists of a base station connecting apparatus connected to wired telephone channels, and a radio telephone handset provided for the base station in a one to one correspondence, and the frequencies of its signals are fixed such that up radio channels from the radio telephone handsets to the base station utilize signals of frequency $f_1$, while down telephone channels from the base station to the radio telephone handsets utilize signals of frequency $f_2$. As a consequence, where two radio telephone handsets are utilized, it is necessary to install two base stations.

With such a radio telephone system utilizing two radio telephone handsets and two base stations, however, two radio telephone handsets are not usually used simultaneously, so that provision of two base stations is not economical.

In recent years, for the purpose of efficiently utilizing allocated frequencies, a so-called multi-channel access system has been adopted wherein a frequency being used is determined by utilizing a common channel, for example, a control channel between a plurality of base stations, and then the channel is switched to a speech channel corresponding to the frequency. However, when such multi-channel access system is adopted, there is a problem in the case where a base station is provided for each of the two radio telephone handsets that when a ring signal is received from a wired telephone set, the two base stations start connection control using respective control channels simultaneously, whereby radio waves from these control channels interfere with each other. Thus, the connection control is sometimes made impossible.

SUMMARY OF THE INVENTION

It is therefore an object of this invention to provide a radio telephone system control apparatus and a method which enables a connection control for a plurality of radio telephone sets with a single base station as well as transferring from a radio telephone handset in which a voice channel exists to other radio telephone sets.

According to one aspect of this invention, there is provided a radio telephone system control apparatus comprising a plurality of radio telephone handsets, each having a handset transceiver; a base station connected to a wired telephone channel for exchanging signals between the base station and the handset transceivers of said telephone handsets; means provided for said base station for detecting a ring signal through said wired telephone channel; means for sequentially sending, with a predetermined time difference, paging signals each containing a channel designating signal to the handset transceivers of said plurality of radio telephone handsets from the base station transceiver of said base station when said paging is detected; means responsive to the received paging signal for sending a paging response signal to the base station transceiver of said base station from the handset transceiver handsets of said radio telephone sets, and for switching the radio channel of the handset transceivers of said radio telephone handsets to a radio channel corresponding to said channel designating signal; means for switching the radio channel of said base station transceiver of said base station to a radio channel corresponding to said channel designating signal when said paging response signal is received within a predetermined interval after sending out said paging signal from the base station transceiver of said base station.

Whereby the connection control between said wired telephone channel and either one of said plurality of radio telephone handsets based on the ring signal on said wired telephone channel is effected by a single base station.

According to a modified embodiment of this invention, there is provided a radio telephone system control apparatus comprising a plurality of radio telephone handsets, each having a handset transceiver; base station connected to a wired telephone channel for exchanging signals between the base station and the handset transceivers of said radio telephone handsets; means provided for said base station for detecting a ring signal through said wired telephone channel; means for sending a paging signal to the handset transceivers of said radio telephone handsets from the base station transceiver of said base station when said paging is detected by said detecting means; means for sending a paging response signal to the base station radio set of said base station from the handset transceiver of said radio telephone handset in response to said paging signal; means responsive to said paging response signal for sending a channel designating signal to the handset transceiver of said radio telephone handset from the base station transceiver of said base station; means for switching the radio channel of the base station transceiver of said base station to a radio channel corresponding to said channel designating signal; means responsive to said channel designating signal for switching a radio channel of the handset transceiver of said radio telephone set to a radio channel corresponding to said channel designating signal, thereby effecting connection control between said wired telephone channel and either one of said plurality of radio telephone handsets based on the paging through said wired telephone channel with a single base station.

According to another embodiment of this invention, there is provided radio telephone system control apparatus comprising a plurality of radio telephone handsets, each having a handset transceiver; base station connected to a wired telephone channel for exchanging signals between the handset transceivers of said radio telephone handset and said base station; means responsive to a predetermined transfer operation for sending a transfer address designation signal to the base station transceiver of said base station from a handset transceiver of said radio telephone handset subjected to a transfer operation; means responsive to a reception of said transfer address designating signal for sending a paging signal to the handset transceiver of an addressed radio telephone handset from the base station transceiver of said base station; means responsive to the receipt of said paging signal for sending a paging response signal to the base station transceiver of said base station from the handset transceiver of said transfer addressed radio telephone set; means responsive to the receipt of said paging response signal for sending a bell ringing signal to the handset transceiver of said radio telephone handset from the base station transceiver of said base station; means provided for said radio telephone handset for producing a call tone for sending an off-hook signal to the radio telephone handset of said base station from the handset transceiver of said transfer addressed radio telephone handset when said transfer addressed radio telephone handset goes off hook; and means responsive to said off-hook signal for the handset transceiver of a radio telephone handset which has issued a transfer signal from the base station to said master apparatus, thereby substituting said radio telephone handset which has issued said transfer signal with said wired telephone channel and said transfer address radio telephone handset which has sent out said off-hook signal.

According to another aspect of this invention, there is provided a method of controlling a radio telephone system of the type wherein the connection of a wired telephone channel and a plurality of radio telephone handsets is controlled by a single base station connected to said wired telephone channel, said method comprising the steps of; detecting a ring signal on the wired telephone set; sequentially sending, with a predetermined time difference, a paging signal to said plurality of radio telephone handsets from said base station when said paging is detected; connecting a radio channel of said master channel and a radio channel of said radio channel to the same channel when either one of said radio telephone handsets respond to said paging signal; and establishing a speech channel between a radio telephone handset responding to said paging signal and a wired telephone channel connected to said base station.

According to a modification, there is provided a method of controlling a radio telephone system of the type wherein a connection between a wired telephone channel and a plurality of radio telephone handsets is controlled by a single base station connected to said wired telephone channel, said method comprising the steps of: detecting a ring signal on said wired telephone channel; sending a paging signal to said radio telephone handset from said base station when said ring signal is detected; sending a paging response signal to said base station from said radio telephone handset in response to said paging signal; sending a channel designating signal to said radio telephone handset from said base station in response to said paging response signal; switching a radio channel of said base station to a radio channel corresponding to said channel designating signal; switching a radio channel of said radio telephone handset to a radio channel corresponding to said channel designating signal in response to said channel designating signal; and establishing a speech channel between a radio telephone handset responding to said paging signal and said wired telephone channel connected to said base station.

According to another modification, there is provided a radio telephone system control method of the type wherein a connection between a wired telephone channel and a plurality of radio telephone handsets is controlled by a single base station, said method comprising the steps of: sending a transfer address designating signal to the base station transceiver of said base station from a radio telephone handset which has sent out a transfer signal in response to a predetermined transfer operation; sending a paging signal to a transfer address radio telephone handset from said base station when said transfer address designating signal is received; sending a paging response signal to the base station transceiver of said base station from said transfer address radio telephone handset when said paging signal is received; and connecting the transfer address telephone handset responsive to said paging signal to said wired telephone channel connected to said base station instead of a radio telephone handset which has operated to send a transfer signal.

DESCRIPTION OF THE PREFERRED EMBODIMENT

Figure 1:
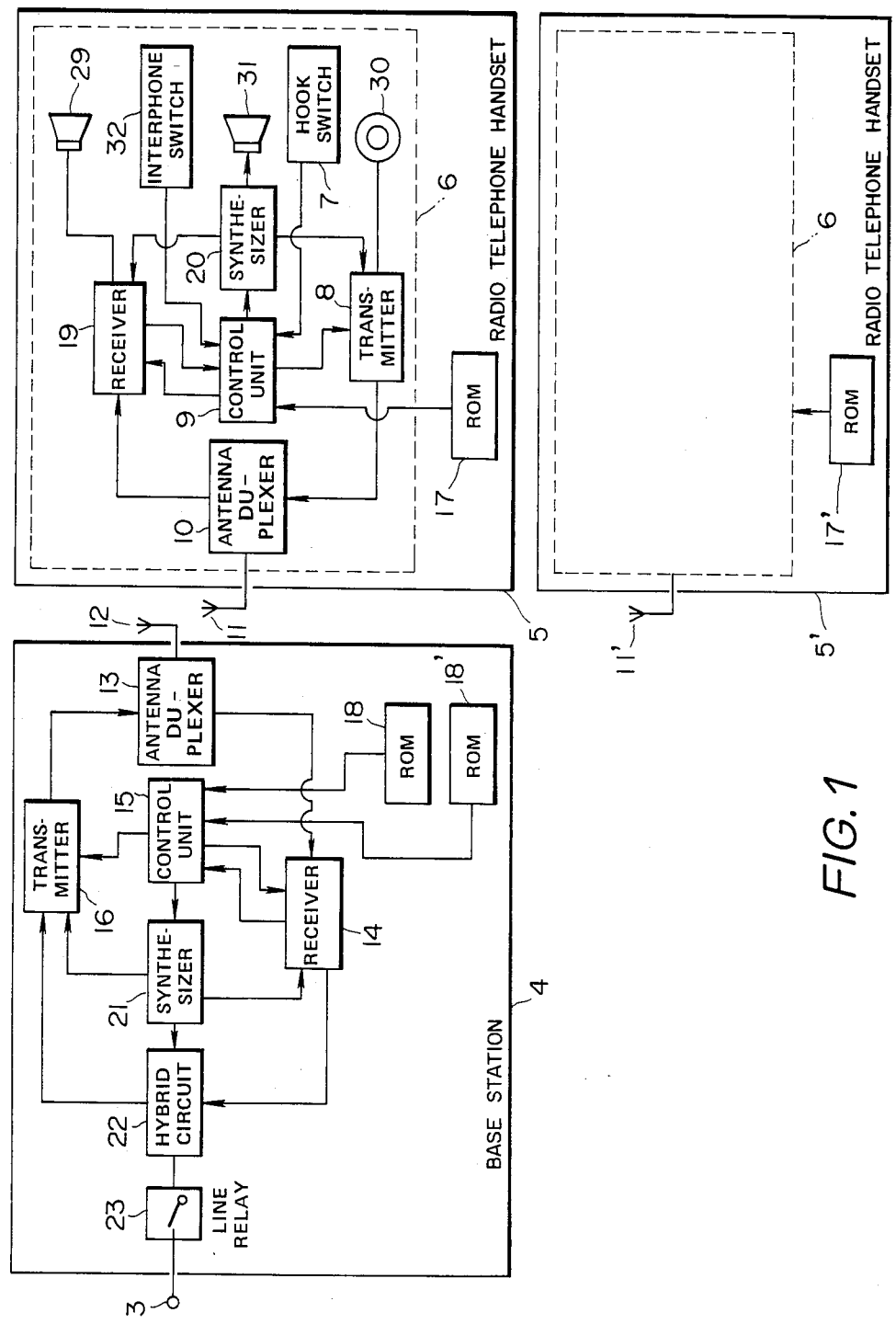
FIG. 1 is a block diagram showing the detail of one embodiment of this invention.

A preferred embodiment of the radio telephone system according to this invention shown in FIG. 1 comprises one base station 4 and two radio telephone handsets 5 and 5'. For the purpose of simplifying the description, only two radio telephone handsets are shown but it will be clear that the invention is also applicable to three or more radio telephone handsets. The base station 4 is connected to a wired telephone channel, not shown, through a terminal 3. A signal from the wired telephone channel inputted to terminal 3 is supplied to a transmitter 16 via a line relay 23 and a hybrid circuit 22, while the output from the transmitter 16 is sent out from an antenna 12 via an antenna duplexer 13. On the other hand, a signal received by antenna 12 is applied to a receiver 14 through antenna duplexer 13, and the output from the receiver 14 is supplied to the wired telephone channel via hybrid circuit 22, line relay 23 and terminal 3. A synthesizer 21 is provided for determining the radio frequency of the transmitter 16 and the receiver 14, and a control unit 15 is provided for the purpose of controlling transmitter 16, receiver 14 and synthesizer 21. Read only memory devices (ROM) 18 and 18' are provided for the purpose of storing identification information for controlling the connections to radio telephone sets to be described later, the identification information being used in the control unit 15.

The radio telephone handsets 5 and 5' are connected to the base station through radio channels. The radio telephone handsets 5 and 5' have the same construction except that their ROMs 17 and 17' store different information. More particularly, element 6 bounded by dotted lines in FIG. 1 has the same construction for radio telephone handsets 5 and 5' so that in the following description, elements utilized in radio telephone handset 5' are designated by the same reference numberals as those used in the radio telephone handset 5 except addition of a prime. The signal transmitted from the base station is received by an antenna 11 and applied to a receiver 19 through an antenna duplexer 10, and the output of the receiver 19 is supplied to a handset or loudspeaker 29 to be connected to generate sound. An input signal to a microphone 30 is sent to the base station 4 via transmitter 8, antenna duplexer 10, and antenna 11. A synthesizer 20 is provided for determining the radio frequency of receiver 19 and transmitter 8, while a control unit 9 is provided for controlling receiver 19, transmitter 8 and synthesizer 20. A loudspeaker 31 connected to the synthesizer produces a call tone. A hook switch 7 is provided to effect an origination and to respond to the call tone produced by the loudspeaker 31.

The information stored in ROMs 17 and 17' corresponds to that stored in ROMs 18 and 18' of the base station 4.

This embodiment employs a multichannel access system comprising a single control channel (C-CH) and a plurality, for example 45, of speech channels. Thus a speech channel is established by commonly utilizing a single control channel by a plurality of apparatus. The operation of this embodiment will be described with reference to the flow charts shown in FIGS. 2 through 6.

Figure 2:
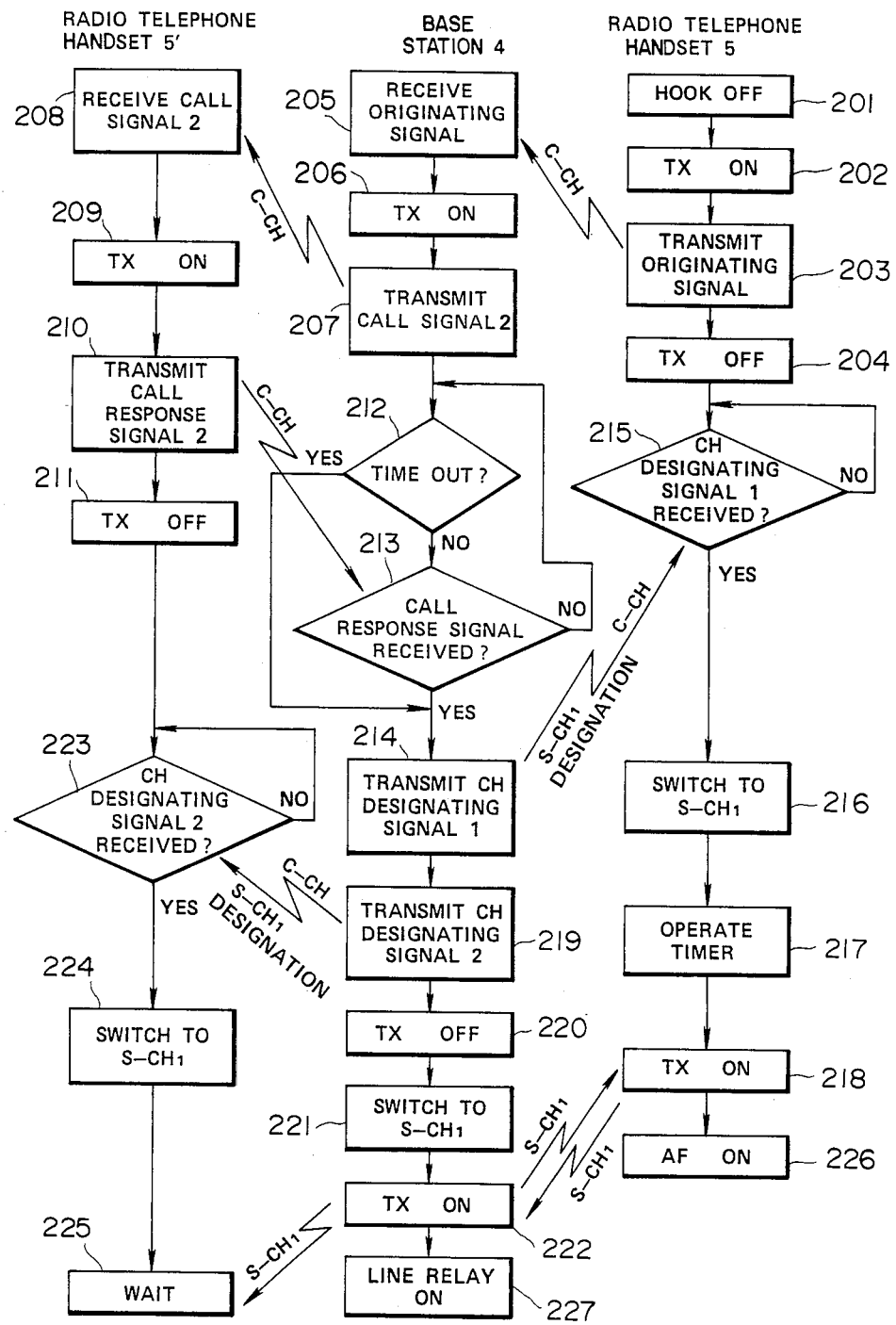
FIGS. 2 through 6 show flow charts showing the operation of the embodiment shown in FIG. 1.

FIG. 2 shows a flow chart for the case when radio telephone handset 5 originates a call. At step 201, when the hook switch 7 of the radio telephone handset 5 is hooked off at step 202, this state change is detected by control unit 9 and this unit 9 turns ON the transmitter 8, and then at step 203 the originating signal is sent to the base station 4 via antenna duplexer 10 and antenna 11. The transmission of the originating signal from the radio telephone set 5 to the master apparatus 4 is made by using the control channel (C-CH). Upon termination of the transmission of the originating signal, at step 204, the control unit 9 turns off the transmitter 8. At step 205, the base station 4 receives with receiver 14 the originating signal via antenna 12 and antenna duplexer 13 and the demodulated output from the receiver 14 is applied to the control unit 15. Then at step 206, the control unit 15 turns ON transmitter 16 for transmitting a call signal to radio telephone handset 5' at step 207. The transmission of the call signal from the master apparatus 4 to the radio telephone handset 5' is performed by using the control channel (C-CH). For the purpose of selectively sending the call signal to the radio telephone handset 5', an identifying information is incorporated into the call signal stored in the ROM 18'. When the radio telephone handset 5' receives the call signal, it compares the identifying signal contained in the call signal with the information stored in ROM 17', and when they coincide with each other, the radio telephone handset 5' accepts the call signal. In the following, a digit '2' shows a signal containing the identifying signal stored in ROM 18', while a digit '1' shows a signal containing an identifying signal stored in ROM 18. An identifying signal stored in ROMs 18, 18', 17 and 17' is made up of a identifying code common to both radio telephone handset 5 and 5' and individual identifying codes assigned to respective radio telephone handset 5 and 5'. The common identifying code is used to identify the other radio telephone handset.

At step 208, the radio telephone handset 5' receives a call signal 2 transmitted from the base station 4 by receiver 19' through antenna 11' and antenna duplexer 10'. The demodulated output from receiver 19' is supplied to control unit 9' whereby it turns ON transmitter 8' at step 209, and a call response signal 2 is sent to the base station 4 at step 210. As has been pointed out before, the call response signal 2 contains an identifying signal stored in ROM 17'. Upon termination of the call response signal 2, at step 211, the control unit 9' of the radio telephone handset 5' turns OFF transmitter 8'.

After sending the call signal 2 at step 207, at step 212 the master apparatus 4 executes a judgment as to whether a predetermined time has elapsed or not. When the result of judgment shows that the predetermined time has not yet elapsed, that is, a time out has not occurred, the program is transferred to step 213 at which a judgment is made as to whether receiver 14 has received a call response signal 2 from radio telephone handset 5' or not. When the result of judgment at step 213 is NO, the program is returned to step 312. When result of judgment at step 212 shows a time out and when the result of judgment at step 213 shows receipt of a call response signal 2, the program is transferred to step 214. More particularly, when a predetermined time has elapsed after sending out a call signal 2 from the base station 4, or when a call response signal 2 is received from radio telephone handset 5', the program is transferred to step 214.

At step 214, a channel designating signal 1 for designating a predetermined channel is transmitted to radio telephone handset 5 by using the control channel. At step 215, the radio telephone handset 5 executes a judgment as to whether the radio telephone handset 5 has received the channel designating signal 1 or not. When the result of judgment is YES, the control unit 9 controls the synthesizer 20 for switching the radio frequency of transmitter 8 and receiver 19 to that corresponding to a predetermined speech channel (S-CH$_1$) at step 216. After that, at step 217 a timer is operated and after a predetermined time, the transmitter 8 is turned ON at step 218.

Following the transmission of the channel designating signal at step 214, at step 219, base station 4 sends out a channel designating signal 2 to radio telephone handset 5' by using the control channel. The channel designating signal 2 designates the same speech channel as the channel designating signal 1. Upon completion of the transmission of the channel designating signal, at step 220, the master apparatus 4 turns OFF transmitter 16 so as to control the synthesizer 21, thereby switching the transmission/reception frequency to that corresponding to speech channel (S-CH$_1$) and the turning ON transmitter 16 at step 222. As a consequence, speech between the base station and the radio telephone handset 5 becomes possible by utilizing the speech channel (S-CH$_1$).

At step 223, in radio telephone handset 5' a judgment is made as to whether the channel designating signal 2 sent from the base station 4 has been received or not. When the result of judgment executed at step 223 is YES, the program is advanced to step 224 at which the transmission/reception frequency is switched to that corresponding to speech channel (S-CH$_1$) and at step 225, the state is changed to a waiting state. Under this state since the transmitter 8' at the radio telephone handset 5' is OFF, the radio telephone handset 5' can receive only a signal from the base station 4 utilizing speech channel (S-CH$_1$).

After turning ON the receiver 8 at step 218, the radio telephone set 5 turns ON the audio frequency circuit of the transmitter 8 and receiver 19 at step 226. At step 222, the base station turns ON transmitter 16 and turns ON line relay 23 at step 227 for closing a relay contact, whereby radio telephone handset 5 can communicate speech through a wired telephone channel connected to terminal 3 of the base station 4 by using a speaker 29 and microphone 30. In this state, when the hook switch 7' of the radio telephone handset 5' now in the waiting state is hooked OFF, the reception of speech is possible but transmission is impossible.

The operation of a case wherein a ring signal is received by the base station from the wired telephone channel will be described as follows.

Figure 3:
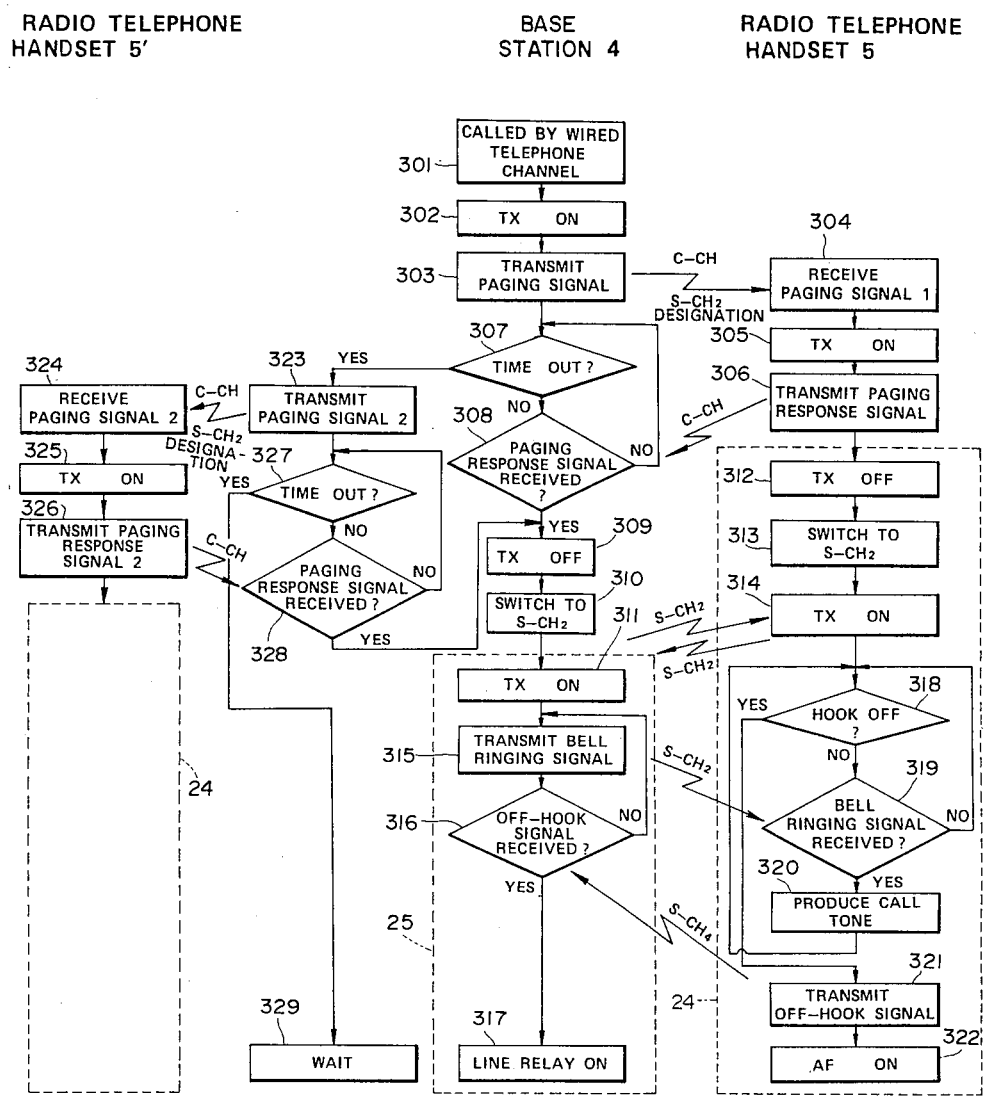

FIG. 3 shows a flow chart showing the operation of a case in which a ring signal is received by the base station from a wired telephone channel. The detection of the ring signal is made by judging the presence or absence of the ring signal by the control unit 15 based on the output signal of a detecting circuit, not shown, connected to the wired telephone channel. At step 301, when a ring signal is received by the master apparatus, in other words, when the base station is called by the wired telephone channel, at step 302 the base station turns ON the transmitter 16 so as to send out a paging signal containing a designating signal that designates a predetermined speech channel at step 303. Paging signals are sent to respective radio telephone sets in a predetermined order of priority which is determined by the order of inserting IC sockets into ROMs 18 and 18' or by the order of information prestored in ROMs 18 and 18'. The order of priority may be set by an independent switch or the like, or may be randomly set by generating a suitable random number. Further, the order of priority can be set according to the hysteresis of the connection to the wired telephone channel. Thus, for example, the most recently used radio telephone handset or the radio telephone set most frequently used can be set to the highest priority.

In the flow chart shown in FIG. 3, the radio telephone handset 5 is a higher order of priority than the radio telephone handset 5'. Thus, at step 303, a paging signal 1 is sent to radio telephone handset 5. At step 304, when the radio telephone handset 5 receives the paging signal 1, transmitter 8 is turned ON at step 305, and a paging response signal 1 is sent to the base station at step 306.

The base station 4 monitors the paging response signal 1. When the paging signal is received within a predetermined interval after sending out the paging signal 1 at step 303, or more particularly, at step 307, when it is judged that there is no time out, and at step 308, when it is judged that the paging response signal 1 has been received, the program is transferred to step 309 for turning OFF receiver 16. Then at step 310, a radio channel is switched to a speech channel (S-CH$_2$). After that at step 311, the transmitter 16 is turned ON.

At step 306, upon termination of the transmission of the paging response signal 1, at step 312, the radio telephone handset 5 turns OFF transmitter 8 to switch the radio channel to the speech channel (S-CH$_2$). After that, at step 314, transmitter 8 is turned ON again, thereby establishing a speech channel between base station 4 and radio telephone handset 5 by utilizing the speech channel (S-CH$_2$).

At step 311, base station turns ON transmitter 16 and then at step 315, base station sends out a bell ringing signal by using the speech channel (S-CH$_2$). At step 319 as the radio telephone handset 5 receives the bell ringing signal, at step 320, call tone is produced from loudspeaker 31. At step 318 when the hook switch 7 is hooked off in response to the call tone, at step 321, an off-hook signal is sent to base station 4 through the speech channel (S-CH$_2$). Then at step 322, the audio frequency circuit is turned ON.

At step 316 when base station 4 receives the off-hook signal from radio telephone handset 5, at step 317, the line relay 23 is turned ON, whereby the radio telephone handset 5 can exchange speech with a wired telephone channel through the base station 4.

At step 307, when time out is judged, that is where a paging response signal 1 is not returned from the radio telephone handset 5 after elapse of a predetermined interval, after sending out of the paging signal, at step 323 a paging signal 2 for the radio telephone handset at the next level of priority is sent out. At step 324, when the radio telephone handset 5' receives the paging signal 2, at step 325, the transmitter 8' is turned ON to send out the paging response signal 2 at step 326. When this paging response signal 2 is received by the base station 4 within a predetermined interval after sending out the paging signal 2, the program is transferred to step 309 at which the transmitter 16 is turned OFF, and then the channel is switched to speech channel (S-CH$_2$), whereby the transmitter 16 is turned ON again to send out a bell ringing signal at step 315.

After sending out the paging response signal 2, the radio telephone handset 5' executes the same operations as the radio telephone handset 5 with respect to a portion 24 of the flow chart bounded by dotted lines. More particularly, transmitter 8' is turned OFF first for switching the speech channel (S-CH$_2$) and turning ON again the transmitter 8'. When a bell ringing signal is received from the base station, a call tone is sent out. When the hook switch 7' is taken off-hook in response to the call tone, an off-hook signal is sent out and then the audio frequency circuit is turned ON.

At step 316, when the base station receives an off-hook signal from radio telephone handset 5', at step 317, the line relay is turned ON so as to connect the radio telephone handset 5' to the wired telephone channel via the master apparatus.

When the time out is judged at step 327, that is when no paging response signal 2 is sent back from radio telephone handset in a predetermined interval even though a paging signal 2 has been sent out, the program is transferred to step 329, thus bringing the base station to the waiting state.

Figure 4:
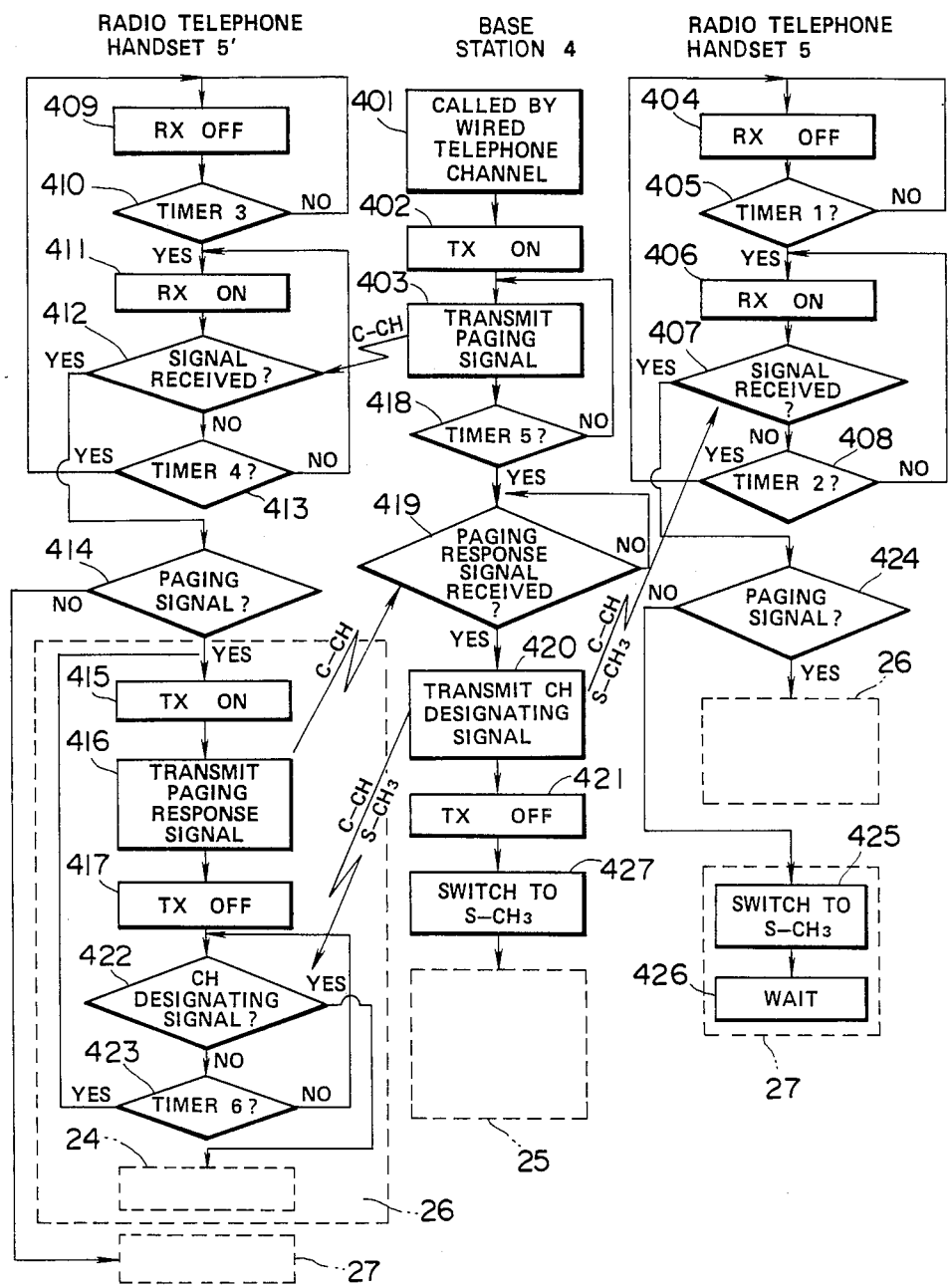

FIG. 4 shows another flow chart in a case where a ring signal is received by the base station from a wired telephone channel. As can be noted from this flow chart, radio telephone handsets 5 and 5' intermittently receive signals at different periods and the base station sends a paging signal containing only the common identifying code. When either one of the radio telephone handsets 5 and 5' (in the flow chart telephone handset 5') respond to the paging signal, both radio telephone handsets 5 and 5' are connected to the predetermined speech channel (S-CH$_2$) so as to cause the telephone handset 5' to generate a call tone and the telephone handset 5', which went off-hook in response to the call tone, is connected to the wired telephone channel, whereas the radio telephone handset 5 is brought to the waiting state.

At step 401 when there is a call from the wired channel, at step 402, the base station 4 turns ON transmitter 16 for transmitting a paging signal over the control channel (C-CH) at step 403. As above described, the paging signal contains only the common identifying code.

In a condition when radio telephone handsets 5 and 5' do not receive any signal, they intermittently receive the signal at a predetermined period (battery saving operation). More particularly, at step 404, radio telephone set 5 turns OFF receiver 19 and as the set time of the timer 1 elapses it turns ON receiver 19 at step 405. On the other hand, at step 407 where there is no received signal and the set time of timer 2 has elapsed at step 408, the receiver 19 is turned OFF again. In the same manner, at step 409 radio telephone handset 5' turns OFF receiver 19'; and as the set time of time 3 has elapsed at step 410, the receiver 19' is turned ON. At step 412 where there is no signal received, and at step 413 the set time of timer 4 has elapsed, the receiver 19' is turned OFF again.

Suppose now that a paging signal transmitted from base station 4 at step 403 is received by radio telephone handset 5' and that the reception is judged at step 412. In this case, the program is transferred to step 414 so as to make a judgment as to whether the received signal is a paging signal or not. When the signal is the paging signal, at step 415, transmitter 8' is turned ON for sending out a paging response signal at step 416 and for turning OFF the transmitter 417 at step 417. When the paging response signal is received by the base station 4 at step 419 in a predetermined interval after sending out the paging signal at step 403, the base station 4 sends out a channel designating signal that designates a predetermined speech channel at step 420. After that, at step 421, transmitter 16 is turned OFF. When the radio telephone handset 5 receives the channel designating signal at step 423 in a predetermined interval after sending out the paging response signal at step 416, and when the received signal is judged as the channel designating signal at step 422, the program is transferred to the flow chart shown by dotted line block 24. This flow chart is the same as the flow chart in block 24 shown in FIG. 3.

At step 407, the channel designating signal transmitted from the base station 4 is judged by radio telephone handset 5, and then the program is transferred to step 424. In this case, since the signal is not the paging signal, after switching the channel to speech channel (S-CH$_3$) at step 425, and the radio telephone handset is brought the waiting state at step 426.

At step 421, after turning OFF transmitter 16, the base station switches the channel to the speech channel (S-CH$_3$) at step 427 and then the program is transferred to the flow chart shown by block 25. The flow chart shown by this block 25 is the flow chart shown by block 25 in FIG. 3. In FIG. 4, two flow charts shown by each of blocks 26 and 27 are the same, respectively.

Figure 5:
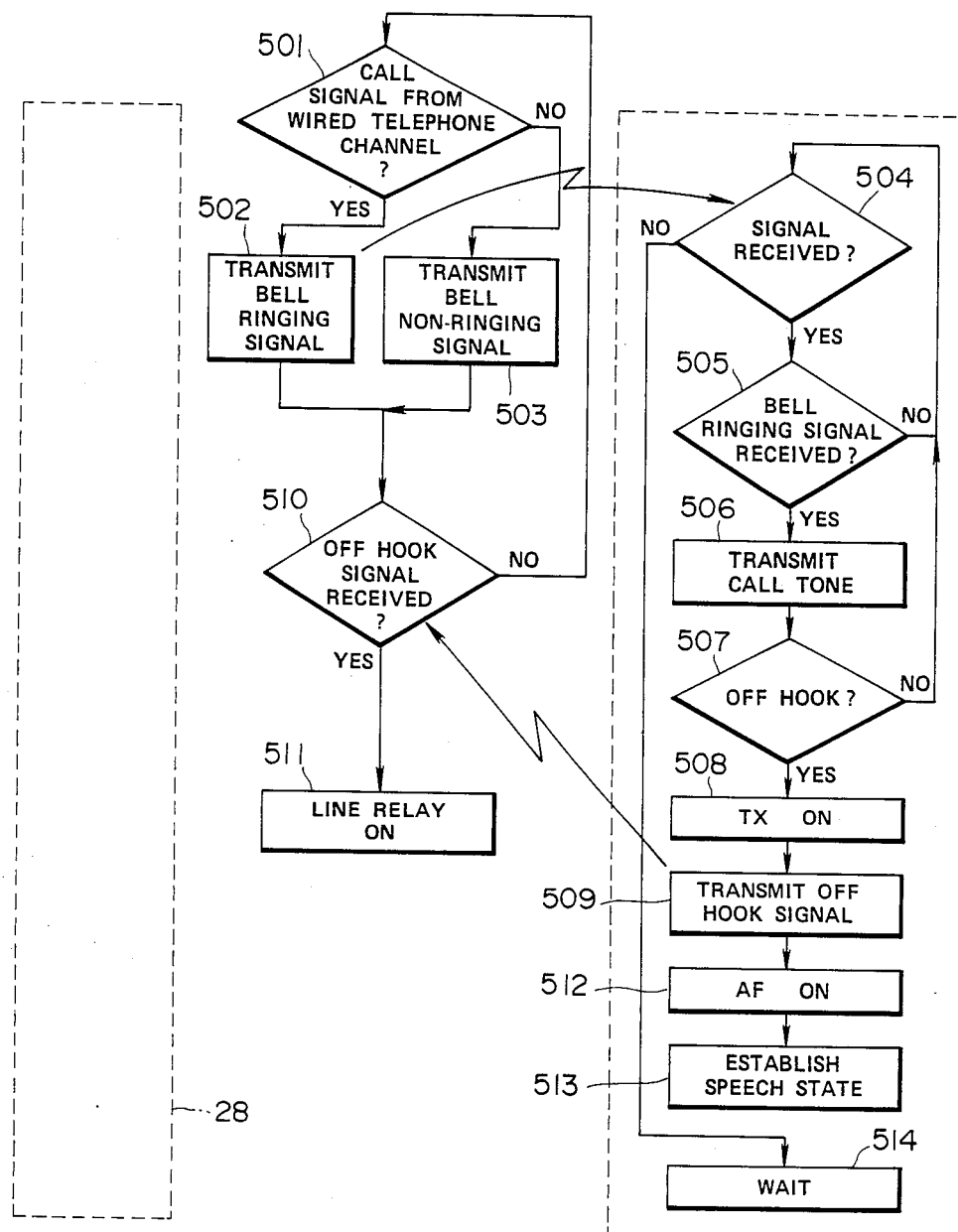
Figure 6:
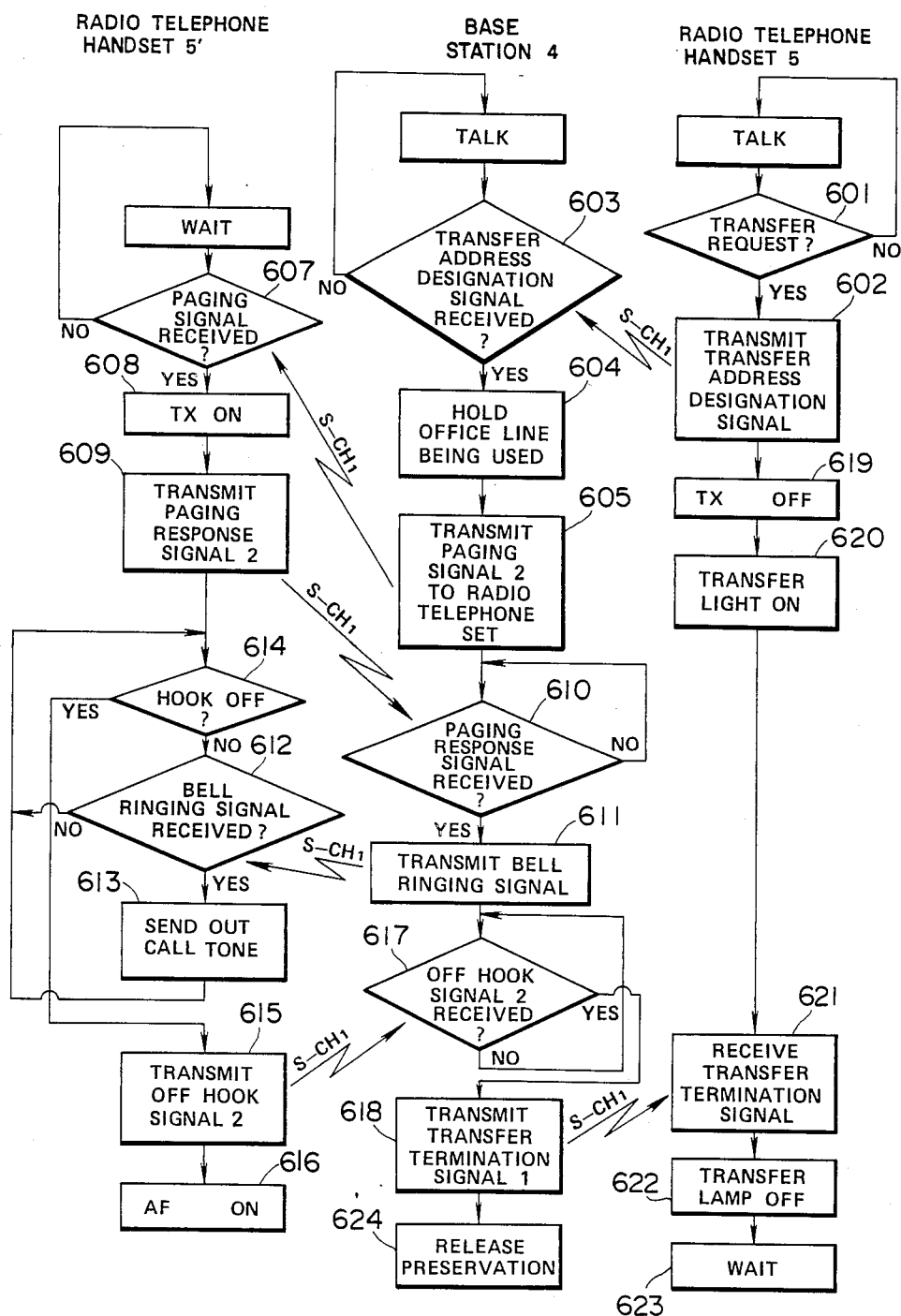

FIG. 5 shows a flow chart where a ring signal is received from the wired telephone channel. The flow chart shown in FIG. 6 is a flow chart after the master apparatus 4 and the radio telephone handsets 5 and 5' are connected to the same speech channel in the same manner as the flow chart shown in FIG. 4. At step 501, the base station 4 judges as to whether there is a ring signal from the wired telephone channel. When it is judged that there is a ring signal, at step 502, a bell ringing signal is sent out, whereas when it is judged that there is no ring signal, at step 503, a bell non-ringing signal is sent out. Whether the bell ringing signal is received or not is judged by radio telephone handset 5, for example at step 504.

At step 505, when it is judged that the received signal is the bell ringing signal, a call tone signal is sent out at step 506, and the hook switch 7 is hooked OFF at step 507 in response to the call tone. Then, transmitter 8 is turned ON at step 508 to send out an off-hook signal at step 509 which is received by base station 4 at step 510, whereby the base station 4 turns ON the line relay 23 at step 511. At step 509, after sending out the off-hook signal, the radio telephone handset 5 turns ON the audio frequency circuit at step 512, thus establishing a speech state at step 513.

At step 505, when it is judged that the bell ringing signal is not received, and at step 507, when it is judged that the hook switch is ON at step 507, that is when it is judged that the hook switch is not OFF, the program is returned to step 504. At step 510, when it is judged that an OFF hook signal is not yet received, the program is returned to step 501. At step 504, when it is judged that no signal is received, the program is returned to step 514 to bring the state to the waiting state. More particularly, with the flow chart shown in FIG. 5, when there is a ring signal through a wired telephone channel, both radio telephone handsets 5 and 5' generate a call tone signal so that the radio telephone handset first taken off hook establishes a speech channel, while the other radio telephone handset goes to a waiting state because there is no signal received. In this case, by using only the bell ringing signal the circuit is put in a waiting state when the bell ringing signal does not arrive for a predetermined interval.

FIG. 6 shows radio telephone period transfer operations of the radio telephone system according to this invention. Suppose now that radio telephone handset 5 is talking whereas the radio telephone handset 5' is in the waiting state. Under these states, when transfer switch 32 of the radio telephone handset 5 is turned ON, at step 601 it is judged that there is a transfer request so that at step 602, the radio telephone handset 5 sends out a signal 2 (connecting signal) designating a radio telephone handset to which the radio telephone period is to be transferred (herein after turned a transfer address). It should be understood that the transfer address designation signal contains information that identifies radio telephone handset 5', that is, the transfer address. At step 603, when base station 4 receives the transfer address signal 2, the program is transferred to step 604 for placing the office line on hold. Then at step 605, a paging signal 2 is sent to radio telephone handset 5' to which the transfer is to be made by using a speech channel (S-CH$_1$).

At step 607, when the radio telephone handset 5' receives the paging signal 2, the program is transferred to step 608 at which transmitter 8' is turned ON. Then at step 609, the paging response signal 2 is sent back to the base station 4 through speech channel (S-CH$_1$). At step 610, the base station detects the paging response signal 2 from the radio telephone handset 5' and then at step 611, a bell ringing signal 2 is sent to the radio telephone handset 5' through speech channel S-CH$_1$.

At step 612, when the radio telephone handset 5' detects the reception of the bell ringing signal 2, it sends out a call tone signal at step 613. When the telephone handset of a called party goes to an off-hook state at step 614, the program is transferred to step 615 at which an off-hook signal is sent to the base station through speech channel (S-CH$_1$). Then at step 616, the audio frequency circuit of receiver 19' is turned ON.

At step 617, when the base station 4 detects the receipt of the off-hook signal from the radio telephone handset 5', at step 617 a transfer termination signal 1 is sent to radio telephone handset through the speech channel (S-CH$_1$).

At step 602, after the radio telephone handset 5 sends out a transfer address signal 2, and then at step 619, transmitter 8' is turned ON. Then at step 620, a transfer lamp 33 is lighted to inform that the signal is now being transferred. At step 621, when radio telephone handset 5 detects the transfer termination signal 1 sent from the base station 4, at step 622, the transfer lamp is extinguished. Then the program is transferred to step 622 to extinguish the transfer lamp 33, and at step 623, the state is brought to the waiting state.

At step 618, after the base station 4 has transmitted the transfer termination signal 1, the hold of the in-use office line is released at step 624, thus completing the transfer of the signal from radio telephone handset 5 to radio telephone handset 5' to enable radio telephone handset 5' to speak.

Although the embodiment shown in FIG. 6 is constructed such that the base station 4 waits to operate until a paging response signal from the transfer address radio telephone apparatus, that is, the radio telephone handset 5', and an off-hook signal 2 are received, it is also possible to construct a system such that the radio telephone handset 5', (i.e., the transfer address telephone set) monitors the paging response signal 2 and the off-hook signal 2' from the radio telephone handset 5' and to send out a transfer impossible signal or a bell ringing signal to the radio telephone handset 5 requesting a transfer, when the paging response signal 2 and the off-hook signal 2 are not sent back from the radio telephone handset 5' even when the predetermined interval has elapsed.

Alternatively, it is also possible to construct a system such that the radio telephone handset 5 requesting transfer monitors a transfer termination signal sent back from the base station 4 and automatically generates an alarm tone when the transfer termination signal is not sent back from the base station even when the predetermined interval has elapsed, thus disenabling transfer, which urges the transfer operator to hook OFF so as to establish an office line connection.

Although in the foregoing embodiments, a single pair of transmitter and receiver was used as the master apparatus, a plurality of pairs of the transmitters and receivers can also be used.

Further, in the foregoing embodiments, this invention was applied to a telephone system of the multi-channel access sytem utilizing a single control channel and a plurality of speech channels. However, the invention is also applicable to a multi-channel system which utilizes only a plurality of speech channels and wherein a specific speech channel is made in the same manner as that utilizing the control channel.

What is claimed is:

1. A Radio telephone system control apparatus comprising:
   a plurality of radio telephone handsets, each having a handset transceiver;
   a base station connected to a wired telephone channel;
   a base station transceiver for exchanging signals between the base station and said handset transceiver for each of said plurality of radio telephone handsets;
   means provided in said base station for detecting a ring signal on said wired telephone channel;
   means for sequentially sending paging signals with a predetermined time delay, each containing a channel designating signal, to said handset transceiver for each of said plurality of radio telephone handsets from said base station transceiver when said ring signal is detected;
   means located in said plurality of radio telephone handsets and responsive to said received paging signal, for sending a paging response signal to said base station transceiver from said handset transceiver for each of said plurality of radio telephone handsets, and for switching the radio channel of said handset transceiver for each of said plurality of radio telephone handsets to a radio channel corresponding to said channel designating signal;
   means for switching the radio channel of said base station transceiver to a radio channel corresponding to said channel designating signal when said paging response signal is received within a predetermined time interval following transmission of said paging signal by the base station transceiver; and
   whereby a single base station controls the connection between said wired telephone channel and either one of said plurality of radio telephone handsets.

2. The radio telephone system control apparatus of claim 1 wherein said paging signals are sequentially transmitted from said base station transceiver to said handset transceiver for each of said plurality of radio telephone handsets according to a predetermined order of priority.

3. The radio telephone system control apparatus of claim 1 wherein said paging signals are sequentially transmitted from said base station transceiver according to an order of priority which is randomly set each time a ring signal is detected by said detecting means.

4. The radio telephone system control apparatus of claim 1 wherein said paging signals are sequentially sent out from said base station transceiver to said handset transceiver for each of said plurality of radio telephone handsets of said plurality of radio telephone handsets according to a predetermined order of priority which is set according to a speech hysteresis of respective radio telephone handsets.

5. The radio telephone system control apparatus of claim 4 wherein said order of priority is set such that the last radio telephone handset used is given the highest priority.

6. The radio telephone system control apparatus of claim 1 further comprising:
   means for transmitting a bell ringing status signal from said base station transceiver to said handset transceiver for each of said plurality of radio telephone handsets after the radio channel of said base station transceiver has been switched to a speech channel corresponding to said channel designating signal;
   means in said radio telephone handset for producing an origination tone signal corresponding to said radio telephone handset; and
   means located in each of said plurality of radio telephone handsets responsive to said origination tone signal, for transmitting an off-hook signal to said base station transceiver when said radio telephone handset goes off-hook in response to said paging signal, so as to connect said wired telephone channel to the one of said plurality of radio telephone handsets which transmitted said off-hook signal.

7. The radio telephone system control apparatus of claim 6 wherein said bell ringing signal is sent to all of said radio telephone handsets.

8. The radio telephone system of claim 1 further comprising:
   means for transmitting a bell ringing status signal to said handset transceiver for each of said plurality of radio telephone handsets from said base station transceiver, after the radio channel of said base station transceiver has been switched to a speech channel corresponding to said channel designating signal, said bell ringing status signal being a bell ringing signal when a ring signal occurs on said wired telephone channel, and being a bell not-ringing signal when no ring signal occurs on said wired telephone channel;
   means provided in said handset transceiver for each of said plurality of radio telephone handsets for producing a call tone signal in response to said bell ringing signal;
   means responsive to said paging signal for sending an off-hook signal to said base station transceiver from said handset transceiver for each of said plurality of radio telephone handsets when each of said radio telephone handsets goes off-hook; and
   means for returning the radio telephone system to a waiting state when none of said radio telephone handsets receives said bell ringing status signal.

9. The radio telephone system control apparatus of claim 8 wherein said bell ringing status signal is transmitted to said plurality of radio telephone handsets.

10. The radio telephone system control apparatus of claim 1 wherein said paging signal sent from said base station transceiver to said handset transceiver for each of said plurality of radio telephone handsets includes a means for identifying one of said plurality of radio telephone handsets by transmitting a first identifying code.

11. The radio telephone system control apparatus of claim 1 wherein said paging response signal transmitted to said base station transceiver from said handset transceiver for each of said plurality of radio telephone handsets has means for identifying the originating radio telephone handset with a second identifying code corresponding to each of said plurality of radio telephone handsets.

12. The radio telephone system control apparatus of claim 10 wherein said first identifying code comprises a third identifying code common to said plurality of radio telephone handsets and said second identifying code corresponding to respective ones of said plurality of radio telephone handsets.

13. The radio telephone system control apparatus of claim 1 wherein said base station transceiver and said handset transceiver for each of said plurality of radio telephone handsets monitor a control channel when they are in a waiting state, and wherein the radio channel of said base station transceiver and the radio channel of said handset transceiver for each of said plurality of radio telephone handsets are switched to a speech channel from said control channel in response to said channel designating signal.

14. The radio telephone system control apparatus of claim 1 wherein said base station transceiver and said handset transceiver for each of said plurality of radio telephone handsets monitor a predetermined channel when they are in a waiting state, and wherein the radio channel of said base station transceiver and the radio channel of said handset transceiver for each of said plurality of radio telephone handsets are switched to another speech channel from said predetermined speech channel in response to said channel designating signal.

15. A radio telephone system control apparatus comprising:
   a plurality of radio telephone handsets, each having a handset transceiver;
   a base station connected to a wired telephone channel;
   a base station transceiver for exchanging radio telephone signals between said base station and said handset transceiver for each of said plurality of radio telephone handsets;
   means provided in said base station for detecting a ring signal on said wired telephone channel;
   means for sending a paging signal to said handset transceiver for each of said plurality of radio telephone handsets from said base station transceiver when said ring signal is detected by said detecting means;
   means for sending a paging response signal to said base station transceiver from said handset transceiver for each of said plurality of radio telephone handsets in response to said paging signal;
   means responsive to said paging response signal for sending a channel designating signal to said handset transceiver for each of said plurality of radio telephone handsets from said base station transceiver;
   means for switching the radio channel of said base station transceiver to a radio channel corresponding to said channel designating signal;
   means responsive to said channel designating signal for switching a radio channel of said handset transceiver for one of said plurality of radio telephone handsets to a radio channel corresponding to said channel designating signal,
   thereby controlling the connection between said wired telephone channel and any one of said plurality of radio telephone handsets in response to said ring signal on said wired telephone channel, and using a single base station.

16. The radio telephone system control apparatus of claim 15 wherein said means for sending said channel designating signal includes means for sending said channel designating signal to said handset transceiver for each of said plurality of radio telephone handsets, and wherein said means for switching said radio channel of said handset transceiver for one of said plurality of radio telephone handsets includes means for switching a radio channel of said handset transceiver for each of said plurality of radio telephone handsets to a radio channel corresponding to said channel designating signal.

17. The radio telephone system control apparatus according to claim 15 which further comprises:
   means for sending a bell ringing status signal to said handset transceiver for one of said plurality of radio telephone handsets from said base station transceiver after the radio channel of said base station transceiver has been switched to a speech channel corresponding to said channel designating signal;
   means provided for one of said plurality of radio telephone handsets for producing a call tone in response to said bell ringing status signal; and
   means responsive to said call tone for sending an off-hook signal to said base station transceiver from said handset transceiver for one of said plurality of radio telephone handsets when said handset transceiver for one of said plurality of radio telephone handsets goes off-hook, thereby interconnecting said wired telephone channel and said handset transceiver for one of said plurality of radio telephone handsets which has sent out said off-hook signal.

18. The radio telephone system control apparatus according to claim 17 wherein said bell ringing signal is sent to each of said plurality of radio telephone handsets.

19. The radio telephone system control apparatus of claim 15 which further comprises:
  means for sending a bell ringing status signal to said handset transceiver for one of said plurality of radio telephone handsets from said base station transceiver, said bell ringing status signal being a bell ringing signal when there is a ring signal on said wired telephone channel after the radio channel of said base station transceiver has been switched to a speech channel corresponding to said channel designating signal, and said bell ringing status signal being bell not-ringing signal when there is no paging;
  means provided in said handset transceiver for one of said plurality of radio telephone handsets for generating a call tone in response to said bell ringing signal;
  means responsive to said call tone for sending an off-hook signal to said base station transceiver from said handset transceiver for each of said plurality of radio telephone handsets when said handset transceiver for one of said plurality of radio telephone handsets is off-hook; and
  means for returning the telephone system to a waiting state when no bell ringing status signal is received by said handset transceiver for one of said plurality of radio telephone handsets.

20. The radio telephone system control apparatus of claim 19 wherein said means for sending a bell ringing status signal includes means for sending said bell ringing status signal to each of said plurality of radio telephone handsets.

21. The radio telephone system control apparatus of claim 15 further including a means for sending a paging signal over an interval longer than a period of intermittent reception and a means for sending a channel designating signal over an interval longer than said period of intermittent reception.

22. Radio telephone system control apparatus comprising:
  a plurality of radio telephone handsets, each having a handset transceiver;
  a base station having a base station transceiver, connected to a wired telephone channel for exchanging signals between said handset transceiver for each of said plurality of radio telephone handsets and said base station transceiver;
  means responsive to a predetermined transfer operation for sending a transfer address designation signal to said base station transceiver from the handset transceiver of one of said plurality of radio telephone handsets subject to a transfer operation;
  means responsive to reception of said transfer address designating signal for sending signal to the handset transceiver of a transfer addressed radio telephone handset from the base station transceiver;
  means responsive to reception of said paging signal for sending a paging response signal to said base station transceiver from said transfer addressed radio telephone handset;
  means responsive to reception of said paging response signal for sending a bell ringing status signal to said transfer addressed radio telephone handset from said base station transceiver;
  means provided in said transfer addressed radio telephone handset for producing a call tone for sending an off-hook signal to said base station transceiver from said transfer addressed radio telephone handset when said transfer addressed radio telephone handset goes off-hook; and
  means responsive to said off-hook signal for a radio telephone handset which has issued a transfer signal from said base station transceiver for substituting said radio telephone handset which has issued said transfer address designating signal with said wired telephone channel and said transfer addressed radio telephone handset which has sent out said off-hook signal.

23. The radio telephone system control apparatus of claim 22 wherein said means for sending a paging signal to said transfer addressed radio telephone handset from said base station transceiver includes means for adding an identifying code to said paging signal for identifying an addressed radio telephone handset.

24. The radio telephone system control apparatus of claim 22 wherein said means for sending a paging response signal to said base station transceiver from said transfer addressed radio telephone handset includes means for adding an identifying code to said paging response signal that identifies a radio telephone handset which has issued a transfer address designating signal.

25. The radio telephone system control apparatus of claim 22 wherein said means for sending a paging signal to said handset transceiver for one of said plurality of radio telephone handsets which has issued a transfer address designating signal from said base station transceiver includes means for adding an identifying code to said paging signal that identifies an addressed radio telephone handset.

26. The radio telephone system control apparatus of claim 22 further comprising means responsive to the sending out of said transfer address designating signal for displaying the fact that said radio telephone handset requesting a transfer is now being transferred, and means for terminating a display of said transfer in response to a termination of a transfer termination signal.

27. A method of controlling a radio control system of the type wherein the connection of a wired telephone channel and a plurality of radio telephone handsets is controlled by a single base station connected to said wired telephone channel, said method comprising the steps of:
  detecting a ring signal on said wired telephone channel;
  sequentially sending, with a predetermined time difference, a paging signal to said plurality of radio telephone handsets from said base station when said ring signal is detected;
  connecting a radio channel of said base station to the same radio channel as any one of said plurality of radio telephone handsets responding to said paging signal; and
  establishing a speech channel between said responding one of said plurality of radio telephone handsets and said wired telephone channel connected to said base station.

28. The radio telephone system control method of claim 27 further comprising the steps of:

sending a bell ringing status signal to said responding one of said plurality of radio telephone handsets from said base station when the radio channel of said base station and the radio channel of said responding one of said plurality of radio telephone handsets are connected to the same channel;

causing said responding one of said plurality of radio telephone handsets to generate a call tone in response to said bell ringing status signal;

sending an off-hook signal to said base station from said responding one of said plurality of radio telephone handsets when said responding one of said plurality of radio telephone handsets goes off-hook in response to said call tone so as to interconnect said wired telephone channel and said responding one of said plurality of radio telephone handsets sending out said off-hook signal.

29. The radio telephone system control method of claim 27 further comprising the steps of:

sending a bell ringing status signal consisting of a bell ringing signal when a paging is made to said responding one of said plurality of radio telephone handsets from said base station through said wired telephone channel after the radio channel of said base station and the radio channel of said responding one of said plurality of radio telephone handsets have been connected to the same radio channel, said bell ringing status signal consisting of a bell not-ringing signal when said paging is not made;

generating a call signal from said responding one of said plurality of radio telephone handsets in response to said bell ringing signal;

sending an off-hook signal to said base station from said responding one of said plurality of radio telephone handsets when said responding one of said plurality of radio telephone handsets goes off-hook in response to said call tone; and restoring said responding one of said plurality of telephone handsets of a waiting state when said responding one of said plurality of radio telephone handsets does not receive said bell ringing status signal.

30. A radio telephone system control method of the type wherein a connection between a wired telephone channel and a plurality of radio telephone handsets is controlled by a single base station connected to said wired telephone channel, said method comprising the steps of:

detecting a ring signal on said wired telephone channel;

sending a paging signal to said plurality of radio telephone handsets from said base station when said ring signal is detected;

sending a paging response signal to said base station from said plurality of radio telephone handsets in response to said paging signal;

sending a channel designating signal to said plurality of radio telephone handsets from said base station in response to said paging response signal;

switching a radio channel of said base station to a radio channel corresponding to said channel designating signal;

switching a radio channel of said plurality of radio telephone handsets to a radio channel corresponding to said channel designating signal in response to said channel designating signal; and establishing a speech channel between one of said plurality of radio telephone handsets responding to said paging signal and said wired telephone channel connected to said base station.

31. The radio telephone system control method of claim 30 further comprising the steps of:

sending a bell ringing status signal from said base station to said one of said plurality of handsets responding to said paging signal after the radio channel of said base station has been switched to a speech channel corresponding to said channel designating signal;

generating a call tone from said one of said plurality of handsets responding to said paging signal in response to said bell ringing signal;

sending an off-hook signal to said base station from said one of said plurality of radio telephone handsets which has gone off-hook in response to said paging tone so as to interconnect said wired telephone channel and said one of said plurality of radio telephone handsets which has sent out said off-hook signal.

32. The radio telephone control method of claim 30 further comprising the steps of:

sending a bell ringing status signal from said base station when a ring signal is detected through said wired telephone channel to said plurality of radio telephone handsets after the radio channel of said base station has been switched to a speech channel corresponding to said channel designating signal, said bell ringing status signal consisting of a bell ringing signal when a ring signal is detected and bell not-ringing signal when no ring signal is detected;

generating a call tone in response to said bell ringing signal from said plurality of radio telephone handsets;

sending an off-hook signal to said base station from said plurality of radio telephone handsets when said plurality of radio telephone handsets goes off-hook in response to said call tone; and restoring said plurality of radio telephone handsets to a waiting state when said plurality of radio telephone handsets does not receive said bell ringing status signal so as to interconnect said wired telephone channel and said plurality of radio telephone handsets which have sent out said off-hook signal.

33. A radio telephone system control method of the type wherein a connection between a wired telephone channel and a plurality of radio telephone handsets is controlled by a single base station having a base station transceiver, said method comprising the steps of:

sending a transfer address designating signal to said base station transceiver from one of said plurality of radio telephone handsets which has sent out a transfer signal in response to a predetermined transfer operation hereinafter called a transfer address radio telephone handset;

sending a paging signal to said transfer address radio telephone handset from said base station transceiver when said transfer address designating signal is received;

sending a paging response signal to said base station transceiver from said transfer address radio telephone handset when said paging signal is received; and connecting the transfer address radio telephone handset responsive to said paging signal to said wired telephone channel connected to said base station instead of said one of said plurality of radio telephone handsets which has operated to send a transfer signal.

34. The radio telephone system control method of claim 33 further comprising the steps of:
displaying that said one of said plurality radio telephone handsets issuing a transfer signal is now transferred in response to sending out of said transfer address designating signal; and
terminating said display when a transfer termination signal is received.

* * * * *